United States Patent [19]

Gellert et al.

[11] Patent Number: 5,000,675
[45] Date of Patent: Mar. 19, 1991

[54] INJECTION MOLDING MANIFOLD AND NOZZLE HAVING LATERALLY CLAMPED FLANGES

[75] Inventors: Jobst U. Gellert, Georgetown; Dario S. Vettor, Mississauga, both of Canada

[73] Assignee: Mold-Masters Limited, Georgetown, Canada

[21] Appl. No.: 477,497

[22] Filed: Feb. 9, 1990

[51] Int. Cl.⁵ ............................................. B29C 45/22
[52] U.S. Cl. ................................. 425/549; 264/328.8; 264/328.15; 425/570; 425/573
[58] Field of Search ............ 264/328.8, 328.9, 328.15; 425/549, 562, 564, 566, 570, 571, 572, 573; 285/364, 407

[56] References Cited

U.S. PATENT DOCUMENTS

| | | | |
|---|---|---|---|
| 3,602,532 | 8/1971 | Ehrenberg | 285/364 |
| 4,082,324 | 4/1978 | Obrecht | 285/364 |
| 4,289,335 | 9/1981 | Olbermann | 285/364 |
| 4,695,079 | 9/1987 | Weinhold | 285/364 |
| 4,702,689 | 10/1987 | Schmidt | 425/549 |
| 4,793,795 | 12/1988 | Schmidt et al. | 425/549 |
| 4,810,184 | 3/1989 | Gellert et al. | 425/549 |

Primary Examiner—Timothy Heitbrink
Attorney, Agent, or Firm—Riches, McKenzie & Herbert

[57] ABSTRACT

A number of heated injection molding nozzles are mounted along the side surface of a melt conveying manifold. In one embodiment of the invention, a connector collar having a tapered flange portion is bolted to the side surface of the manifold to provide each melt bore outlet. Each nozzle has a matching flange portion with a melt bore inlet extending laterally from a side surface. The nozzle is mounted on the manifold by securing the flange portions together by bolting a wedge clamp having two halves over the aligned flange portions. This accurately aligns the inlet with the outlet and allows the nozzle to be rotated to a particular angular position. In another embodiment, a melt conduit member is mounted between the manifold and each nozzle. The melt conduit member is clamped to the manifold after being rotated to a desired angular position about a first axis. A nozzle is clamped to the melt conduit member after being rotated to a desired angular position about a second axis which is substantially perpendicular to the first axis. Thus, each nozzle can be located with any desired angular orientation without the melt flowing through an acute angle bend.

10 Claims, 5 Drawing Sheets

INJECTION MOLDING MANIFOLD AND NOZZLE HAVING LATERALLY CLAMPED FLANGES

BACKGROUND OF THE INVENTION

This invention relates generally to injection molding and more particularly to a multi-cavity injection molding system wherein several heated nozzles are mounted along the side surface of an elongated manifold to convey melt to a cavity through a number of spaced gates.

In order to mold large parts using very high injection pressure, it is well known to supply melt through a number of heated nozzles, each aligned with a different gate. However when the cavity is non-linear, it is difficult to mount the different nozzles so they are all properly aligned with the respective gates. An earlier solution to this problem is shown in U.S. Pat. No. 4,702,689 to Schmidt et al. which issued October 1987. U.S. Pat. No. 4,810,184 to Gellert et al. which issued Mar. 7, 1989 shows heated nozzles being bolted to the side surface of the manifold U.S. Pat. No. 4,793,795 to Schmidt et al. which issued Dec. 27, 1988 shows an arrangement for clamping the nozzles in desired positions along the side surface of the manifold. While the systems described in these previous patents each provide significant improvements, there still is a problem in that it remains difficult to quickly set up the system with each of the nozzles accurately aligned with its respective gate. Also, in these previous systems, the nozzles can only be positioned with a particular angular orientation in a single phase. A different clamping arrangement for mounting an actuating mechanism on a nozzle is shown in the applicant's Canadian patent application Ser. No. 592,346 filed Feb. 28, 1989 entitled "Injection Molding Nozzle with Self-Supporting Actuating Mechanism."

SUMMARY OF THE INVENTION

Accordingly, it is an object of the invention to at least partially overcome the problems of the prior art by providing injection molding apparatus with an improved arrangement for accurately aligning a number of different nozzles with their respective gates.

To this end, in one of its aspects, the invention provides an injection molding apparatus having a plurality of heated nozzles spaced along a common elongated manifold with a side surface, each nozzle having a forward end, a rear end, and a side surface, each nozzle being located with the forward end extending into a well in a cavity plate, each nozzle having a melt channel extending from a melt channel inlet on the side surface to a gate leading to a cavity, the manifold having a longitudinal melt bore extending from a common inlet and branching to a plurality of outlet bores, the outlet bores extending respectively to outlets spaced along the side surface of the manifold, each outlet being aligned with the melt channel inlet to one of the nozzles, the improvement wherein each outlet bore of the manifold extends through a first round flange portion which projects from the side surface of the manifold, the melt channel of each nozzle has a lateral portion which extends from the melt channel inlet through a second round flange portion which projects from the side surface of the nozzle, at least one of the first and second round flange portions being tapered and a plurality of clamping means each having first and second opposed portions, the first and second opposed portions each having inner surfaces to define a round opening therebetween, at least one of the inner surfaces being tapered, each clamping means being mounted to receive in said round opening one of the first round flange portions projecting from the manifold and an abutting second round flange portion of a respective nozzle, the first and second opposed portions of the clamping means being tightened together transversely to where the first and second flange portions abut to secure the first and second flange portions together, whereby each nozzle is securely mounted with a desired angular orientation along the side surface of the manifold.

In another of its aspects, the invention provides an injection molding apparatus having a plurality of heated nozzles extending from a common elongated manifold with a side surface, each nozzle having a forward end, a rear end, and a side surface, each nozzle being located with the forward end extending into a well in a cavity plate, each nozzle having a melt channel extending from an inlet on the side surface to a gate leading to a cavity, the manifold having a longitudinal melt bore extending from a melt channel inlet and branching to a plurality of outlet bores, the outlet bores each having a central axis and extending to a common outlet, the outlets being spaced along the side surface of the manifold, the improvement wherein a melt conduit member is mounted between the manifold and each nozzle, the melt conduit member having an inlet face and an outlet face, the outlet face extending substantially perpendicular to the inlet face, the melt conduit member having a melt conduit extending therethrough, the melt conduit having an inlet portion and an outlet portion, the inlet portion extending from a melt conduit inlet through the inlet face and the outlet portion having a central axis and extending to an outlet through the outlet face, each melt conduit member is clamped along the side surface of the manifold with the inlet to each conduit member in alignment with the outlet from one of the outlet bores, each conduit member being clamped in a desired angular position around the central axis of the outlet bore, and a nozzle is clamped to each melt conduit member with the outlet from the outlet portion of the conduit member in alignment with the melt channel inlet to the nozzle, the nozzle being clamped in a desired angular position around the central axis of the outlet portion of the melt conduit through the melt conduit member, whereby a desired angular position of each melt conduit member relative to the manifold and a desired angular position of each nozzle relative to the melt conduit member are selected to provide each nozzle with any desired angular orientation without having any melt flow around a bend having an acute angle.

Further objects and advantages of the invention will appear from the following description taken together with the accompanying drawings.

DETAILED DESCRIPTION OF THE DRAWINGS

Figure 1:
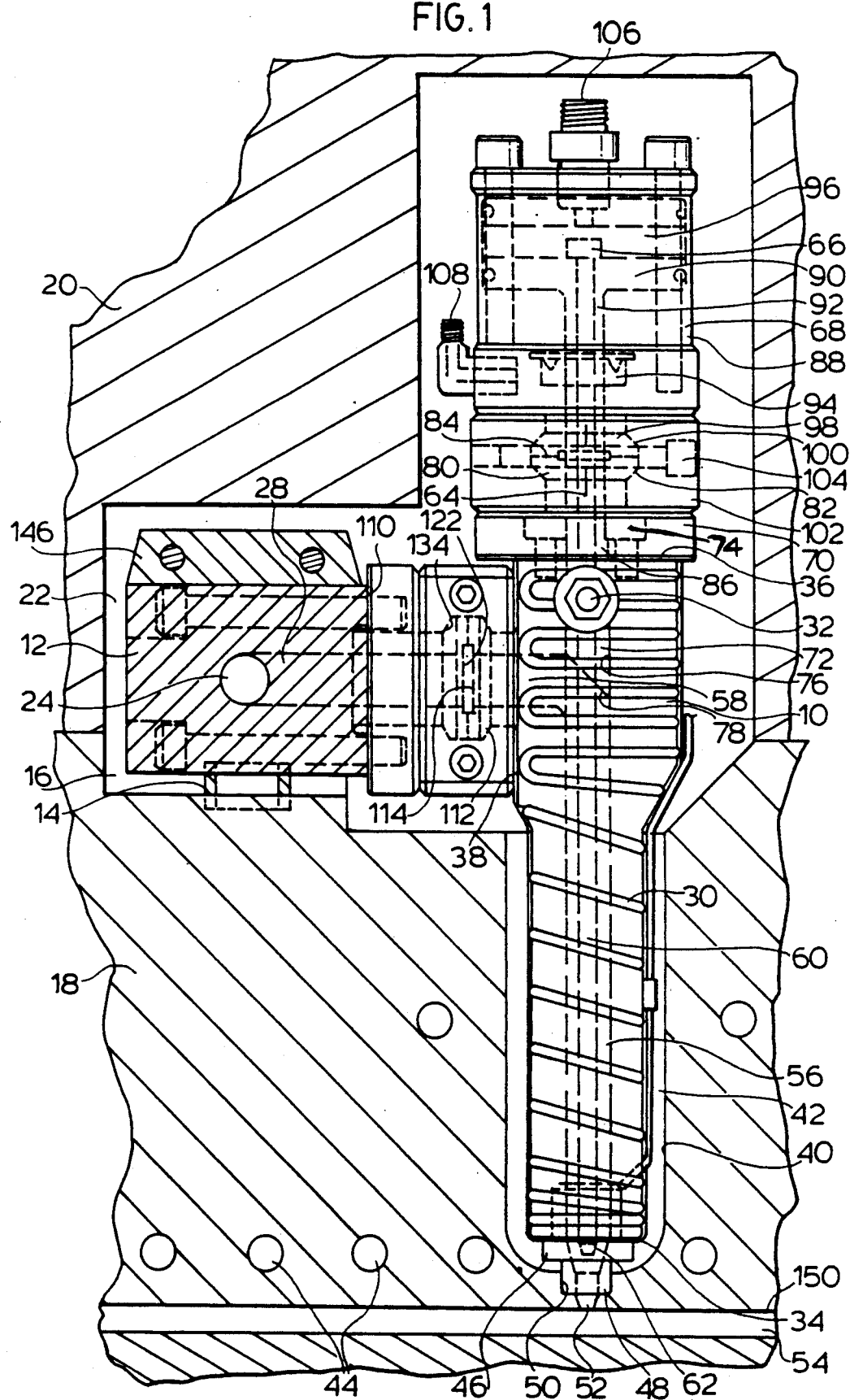
FIG. 1 is a sectional view taken through the manifold and one of the nozzles mounted on the manifold according to one embodiment of the invention.

Reference is first made to FIG. 1 which shows one of several nozzles 10 securely mounted in a desired position along an elongated manifold 12 according to one embodiment of the invention. The manifold 12 is securely positioned by a locating ring 14 in an opening 16 between the cavity plate 18 and the mold back plate 20. The manifold 12 is heated by a heater plate 146, and the hot manifold 12 is separated from the surrounding cooled cavity plate 18 and mold back plate 20 by an insulative air space 22. The manifold 12 has a central melt bore 24 which extends longitudinally from an inlet 26 (FIG. 3) and branches to a number of lateral outlet bores 28.

The steel nozzle 10 is heated by an integral electrical heating element 30 extending from a terminal 32. The nozzle 10 has a forward end 34, a rear end 36 and a side surface 38. The forward end 34 of the nozzle 10 extends into a well 40 in the cavity plate 18. An insulative air space 42 is provided between the heated nozzle 10 and the cavity plate 18 which is cooled by pumping cooling water through cooling conduits 44. In this embodiment, the forward end 34 of the nozzle 10 has a gate insert 46 extending from it. As described in the applicant's Canadian patent application Ser. No. 578,974 filed Sept. 30, 1988 entitled "Injection Molding Nozzle with Replaceable Gate Insert", the gate insert 46 has a forward portion 48 which is received in a seat 50 which extends around the gate 52 leading to the cavity 54. This securely and accurately locates the forward end 34 of the nozzle 10 centrally in the well 40. The nozzle 10 has a melt channel 56 which extends through the gate insert 46 in alignment with the gate 52 in this position. In alternate embodiments, the gate insert 46 need not be provided and various other gating configurations can be used. In fact, for some applications, sprue gating can be used instead of valve gating. As described in more detail below, the melt channel 56 has a lateral portion 58 which extends in alignment with one of the lateral outlet bores 28 in the manifold 12.

An elongated valve member 60 is received centrally in the melt channel 56 of each nozzle 10. The elongated valve pin 60 has a forward end 62 which seats in the gate 52 in the forward closed position, and a portion 64 which extends rearwardly from the rear end 36 of the nozzle 10 to an enlarged head 66. The head 66 of the valve member 60 is engaged by pneumatic actuating mechanism 68 which is mounted on the rear end 36 of the nozzle 10 as described in the applicant's Canadian patent application Ser. No. 592,346 referred to above. A steel connector member 70 having a sealing sleeve portion 72 extending therefrom is secured to the rear end 36 of the nozzle 10 by bolts 74. The sleeve portion 72 extends forwardly into a central bore 76 in the nozzle 10 and fits around the valve member 60 to prevent leakage of pressurized melt as the valve member 60 reciprocates. The sleeve portion 72 extends to where the central bore 76 joins the melt channel 56 and has an angled forward end 78 to redirect the melt from the lateral portion 58. The connector member 70 has a rearwardly extending flange portion 80 with a tapered outer surface 82 and a rear face 84.

The rearwardly extending portion 64 of the valve member 60 extends through a central bore 86 in the connector member 70 into a cylinder 88 having a piston 90. The piston 90 has a hollow neck portion 92 which extends through a high pressure seal 94. The head 66 of the member 60 is secured to the piston 90 by a circular plate 96 which is bolted to the piston 90. The cylinder 88 also has a flange portion 98 with a tapered outer surface 100. The flange portion 98 of the cylinder 88 is secured to the flange portion 80 of the connector member by a lateral wedge clamp 102 which has two halves which are tightened together by bolts 104. Thus, when pneumatic pressure is applied to the cylinder 88 through connectors 106,108 on opposite sides of the piston 90, the piston and the valve member 60 are reciprocated between the retracted open position shown, and the forward closed position in which the forward end 62 of the valve member 60 is seated in the gate 52.

Figure 2:
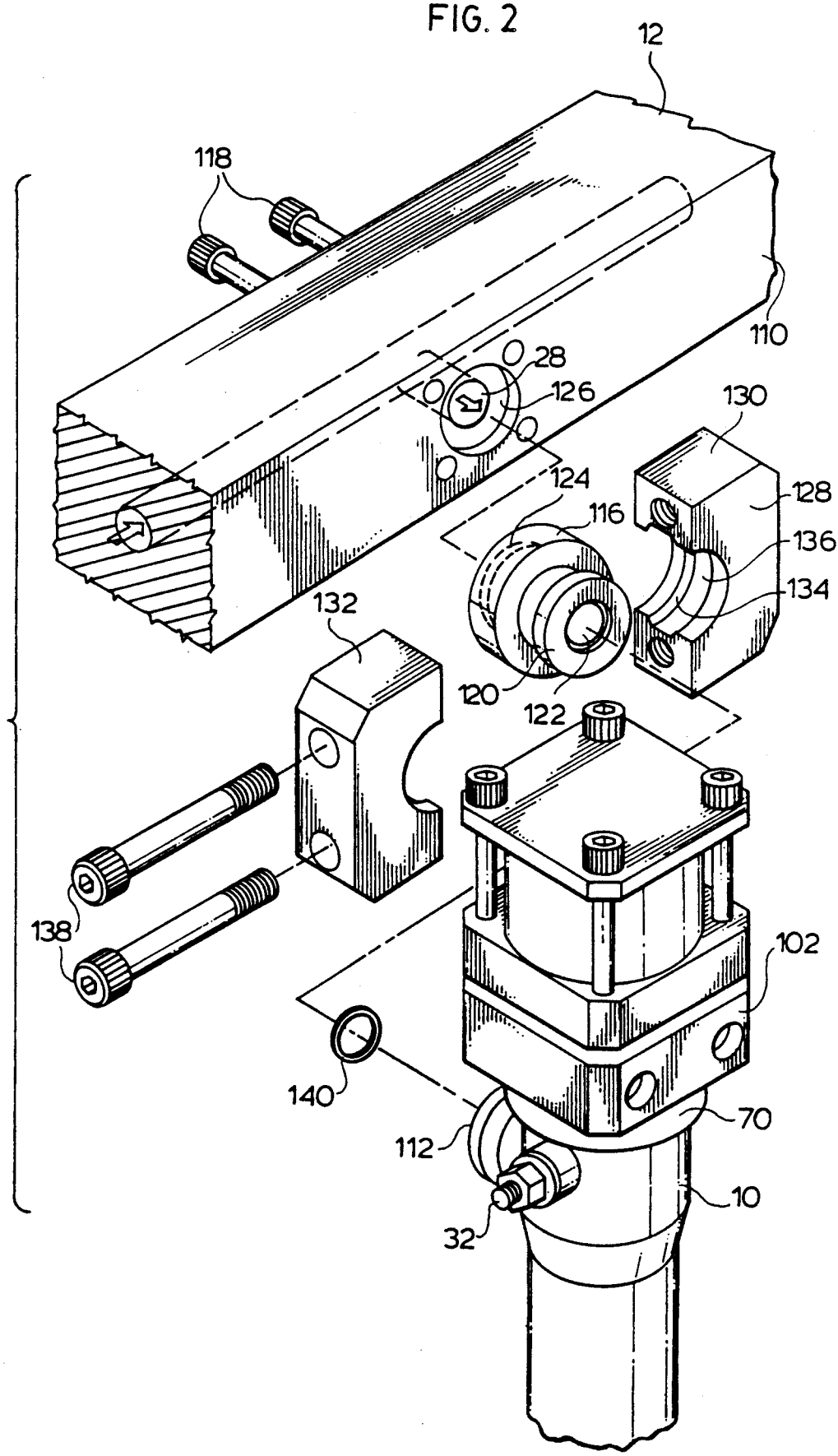
FIG. 2 is an exploded isometric view showing the nozzle, connector collar, and manifold of FIG. 1.

Reference is now also made to FIG. 2 to describe how each nozzle 10 with its attached actuating mechanism 68 is mounted with a desired angular orientation along the side surface 110 of the manifold 12. The nozzle 10 has a steel tapered round flange portion 112 which projects outward from the side surface 38. The lateral portion 58 of the melt channel 56 extends through this flange portion 112 from an inlet 114. A steel connector collar 116 is secured by bolts 118 to the side surface 110 of the manifold 12 around each lateral outlet bore 28 from the longitudinal melt bore 24. As can be seen, each connector collar 116 has an outwardly projecting matching round flange portion 120 through which the outlet bore 28 extends to an outlet 122. Each connector collar 116 also has a neck portion 124 which projects inwardly into a recessed seat 126 in the side surface 110 of the manifold to accurately locate the connector collar 116 in alignment with the outlet bore 28.

Figure 3:
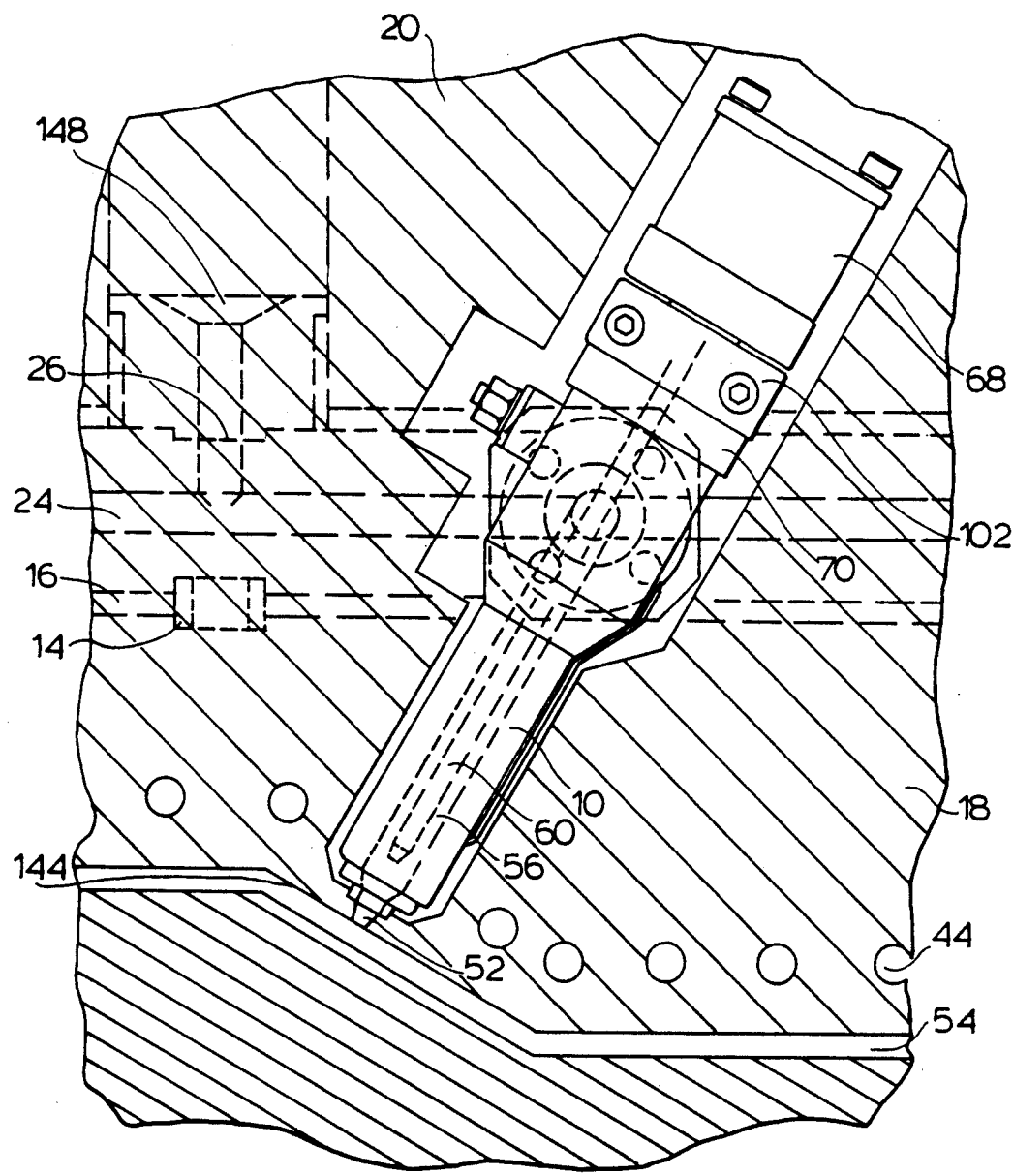
FIG. 3 is a sectional view showing a portion of an injection molding system having a number of nozzles mounted on it according to the same embodiment of the invention.

The flange portion 112 of each nozzle is secured to the flange portion 120 of one of the connector collars 116 by a lateral wedge clamp 128. The wedge clamp 128 has two matching halves 130,132 with tapered inner surfaces 134 which form a round opening 136 to receive the flange portions 112,120. When the halves 130,132 of the wedge clamp 128 are tightened together by bolts 138 over the tapered flange portions 112,120, the tapered inner surfaces 134 bear against them to hold them securely together with the outlet 122 aligned with the inlet 114. As can be seen in FIG. 3, this has the advantage that each of the nozzles 10 can be positioned in any desired angular orientation before the bolts 138 are tightened and it will be retained in that position. This also greatly facilitates realignment, if necessary. In this embodiment of the invention, sealing washer 140 is seated between the flange portions 112,120. The sealing washer 140 is made of a suitable material such as a soft stainless and projects slightly outwardly from each flange portion 112,120. This provides an improved seal against leakage of the pressurized melt when the wedge clamp 128 is tightened.

In use, the system is assembled as shown. As seen in FIG. 3, it is preferable that each gate 52 extend perpendicular to the adjacent wall 144 of the cavity 54, and this is greatly facilitated by the present invention. Electrical power is applied to the heating elements 30 and to the heater plate 146 to heat the manifold 12 and nozzles 10 to a predetermined operating temperature. Pressurized melt from a molding machine (not shown) engaged at a recessed inlet 148 is then injected into the manifold melt bore 24 according to a predetermined operating cycle. The pressurized melt flows out each of the outlet bores 28 and into each of the nozzles 10 through the aligned lateral portions 58 of the melt channel 56. It flows around the valve member 60 through the larger diameter melt channel 56 through the aligned gate insert 46 and gate 52, and into the cavity 54. Pneumatic pressure is also applied to each cylinder 88 according to the cycle to position the valve member in the retracted open position when the injection melt pressure is applied. After the cavities 54 are full, injection pressure is held momentarily to pack and pneumatic pressure is then applied to each cylinder 88 to drive the valve members 60 to the forward closed position in which the forward end 62 of each valve member 60 is seated in a respective gate 52. Injection pressure is then released and after a short cooling period, the mold is opened along the parting line 150 to eject the molded product. After ejection, the mold is closed and pneumatic pressure is reapplied to the cylinders 88 to withdraw the valve members 60 to the open position and injection pressure is reapplied to refill the cavities 54. This cycle is repeated continuously with a frequency dependent upon the size of cavity and type of material being molded.

Figure 4:
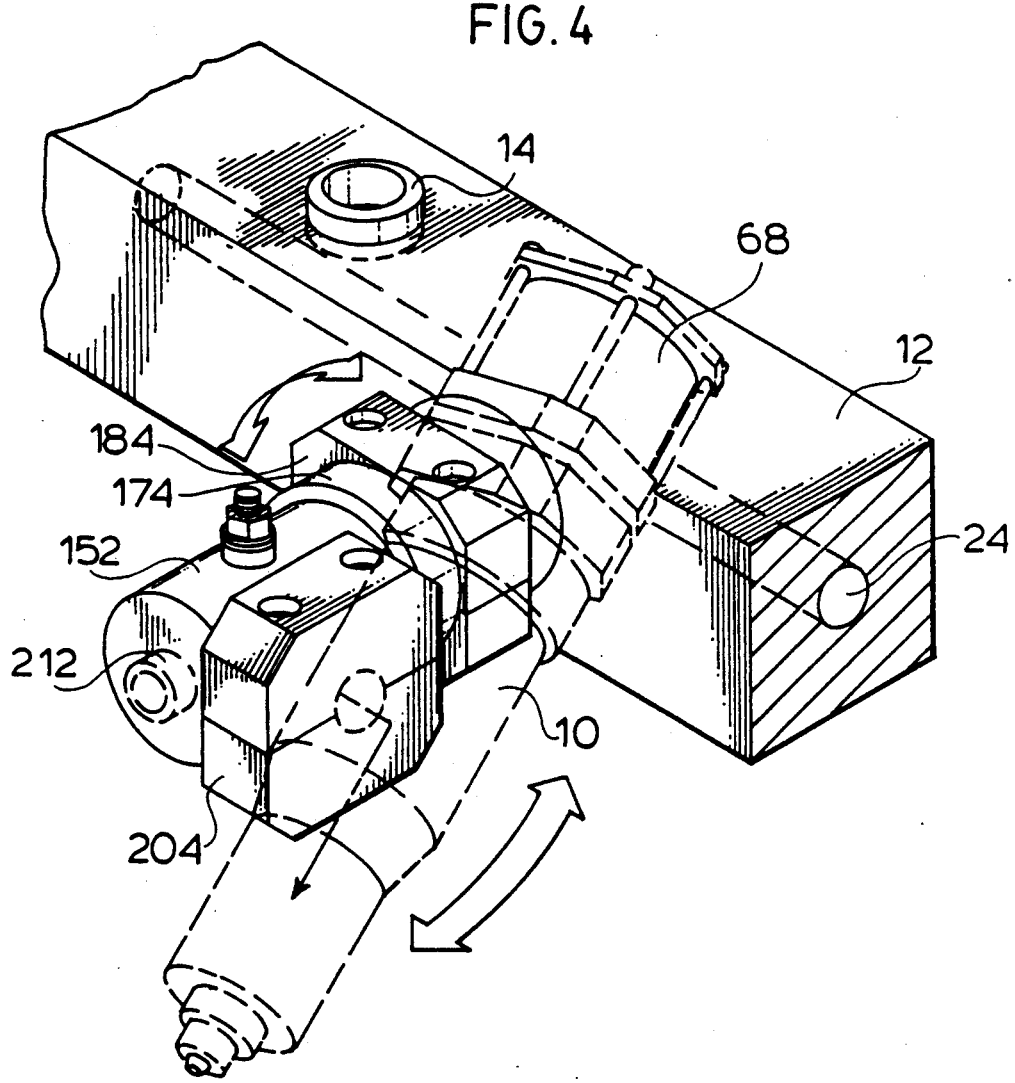
FIG. 4 is an isometric view showing a nozzle and a melt conduit member mounted to a manifold according to another embodiment of the invention.
Figure 5:
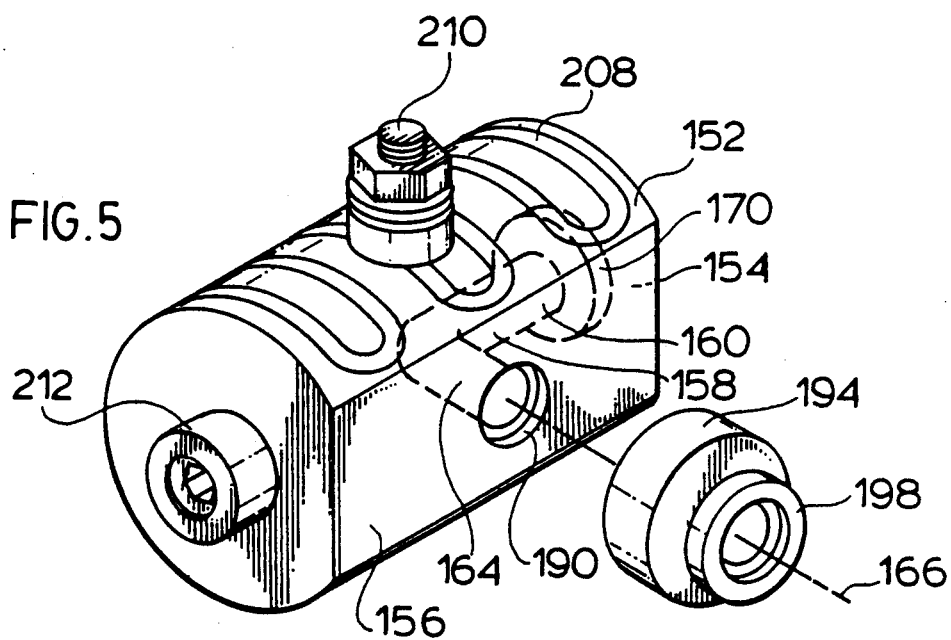
FIG. 5 is an isometric view of the melt conduit members seen in FIG. 4.
Figure 6:
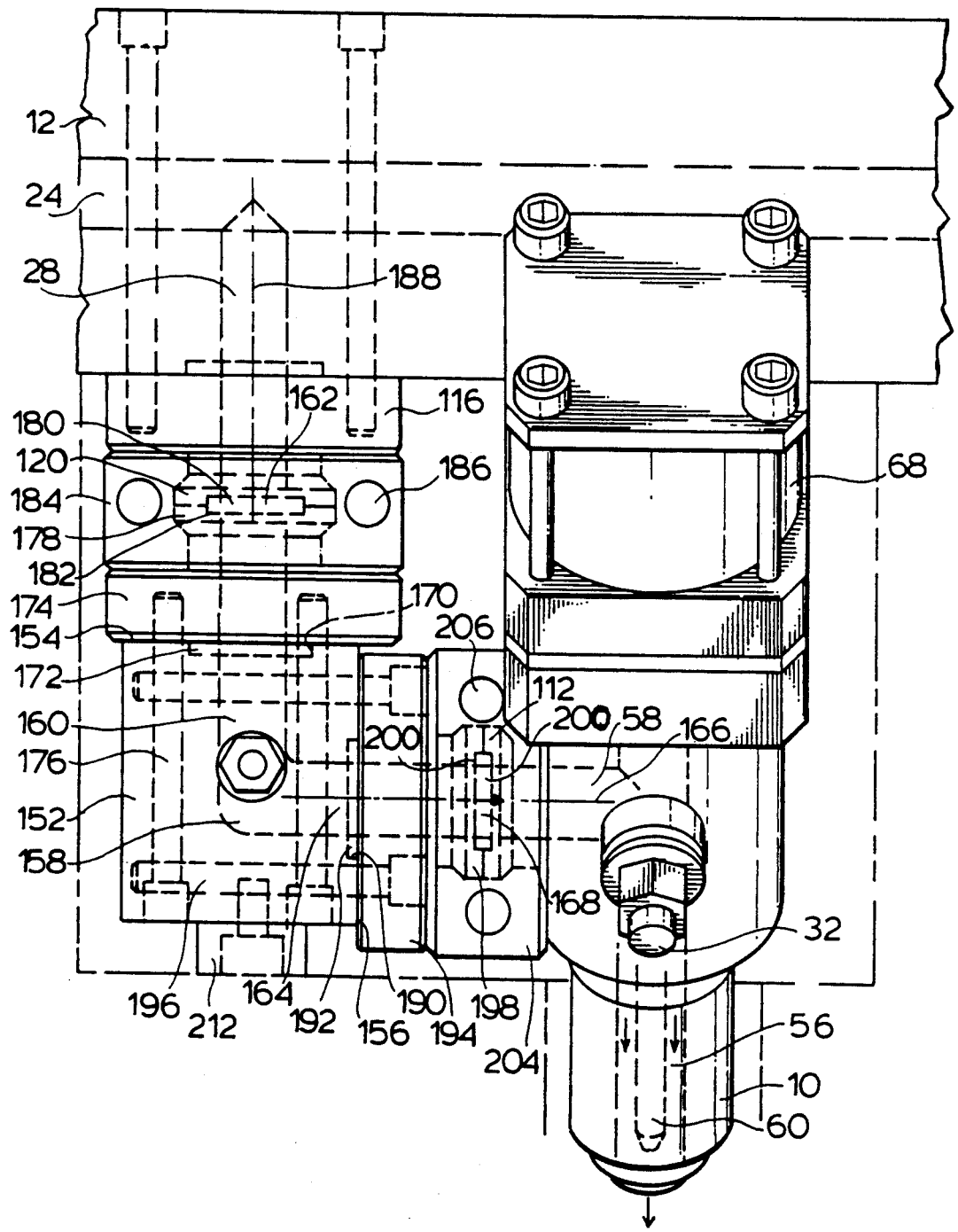
FIG. 6 is a partial sectional view showing the melt flow path through the melt conduit member and nozzle.

Reference is now made to FIGS. 4, 5 and 6 to describe another embodiment of the invention according to which the nozzles 10 mounted along the elongated manifold 12 can be located with any desired orientation and is not restricted to a single plane. As many of the elements of this embodiment of the invention are the same as those of the embodiment described above, they will be described and illustrated using the same reference numerals. Reference is first made to FIG. 4 which shows one of several nozzles 10 mounted along an elongated manifold 12. The nozzle 10 and the manifold 12 have the same structure as described above and therefore it need not be repeated. It will be appreciated that each of the nozzles 10 mounted along the manifold 12 can have a different orientation depending upon the configuration of the particular injection molding system.

In this embodiment of the invention, a melt conduit member 152 (as shown in FIG. 5) is mounted between the manifold 12 and each nozzle 10. Each melt conduit member 152 has an inlet face 154 and an outlet face 156 which extends generally perpendicular to the inlet face 154. The melt conduit member 152 has a melt conduit 158 which extends therethrough from the inlet face 54 to the outlet face 156. The melt conduit 158 has an inlet portion 160 extending from an inlet 162 and an outlet portion 164 with a central axis 166 extending to an outlet 168.

The inlet face 154 of each conduit member 152 has a recessed seat 170 which extends around the inlet portion 160 of the melt conduit 158 to receive the forwardly projecting neck portion 172 of a connector collar 174. The connector collar 174 is secured to the inlet face 154 of the conduit member 152 by bolts 176. The connector collar 174 has an outwardly projecting tapered flange portion 178 through which the inlet portion 160 of the melt conduit 158 extends. As can clearly be seen in FIG. 6, the tapered flange portion 178 matches the flange portion 120 of the connector collar 116 through which one of the outlet bores 28 extends from the manifold 12. A stainless steel sealing washer 180 is also seated between the flange portions 120,178 as described above. The two flange portions 120,178 are secured together by a lateral wedge clamp 184 having two portions which are tightened together by bolts 186 over the flange portions 120,178. This secures the conduit member 152 to the manifold 12 with one of the outlet bores 28 in alignment with the inlet portion 160 of the melt conduit 158 through the conduit member. As will be appreciated, the conduit member 152 can be mounted in a desired angular position around the central axis 188 of the outlet bore 28 by rotating it to that position prior to tightening the bolts 186.

The outlet face 156 of each melt conduit member 152 similarly has a recessed seat 190 which extends around the outlet portion 164 of the melt conduit 158 to receive the forwardly projecting neck portion 192 of another connector collar 194. This connector collar 194 is secured to the outlet face 156 of the conduit member by bolts 196 which extend into the conduit member. This connector collar 194 similarly has an outwardly projecting tapered round flange portion 198 through which the outlet portion 164 of the melt conduit extends. This tapered flange portion 198 matches the tapered round flange portion 112 of one of the nozzles 10 through which the lateral portion 58 of the melt channel 56 extends. Another stainless steel sealing washer 200 is seated in these flange portions 198,112. The flange portions 198,112 are secured together by another lateral wedge clamp 204 having two portions which are tightened together by bolts 206. Thus, the nozzle 10 is mounted to the conduit member 152 with the outlet portion 164 of the melt conduit 158 aligned with the lateral portion 58 of the melt channel 56 through the nozzle 10. The nozzle can be positioned in a desired angular direction around the central axis 166 of the outlet portion 164 of the melt conduit 158 by rotating it to that position prior to tightening the bolts 206.

Consequently, referring particularly to FIG. 4, it can be seen that each nozzle 10 can be given any desired angular orientation relative to the manifold 12 by rotating the melt conduit member 152 relative to the manifold 12, and rotating the nozzle 10 relative to the melt conduit member. While the melt flows through several right angle bends, it does not have to flow through a bend having an acute angle. The melt conduit member 152 is heated by an integral electrical heating element 208 having a terminal 210. In this embodiment, a spacer 212 is provided between the melt conduit member 152 and the adjacent mold (not shown) to assist in accurately locating the conduit member 152.

While the description of the injection molding nozzle mounting and positioning apparatus has been given with respect to preferred embodiments, it is not to be construed in a limiting sense. Variations and modifications will occur to those skilled in the art. For example, the melt conduit member 152 can be made having integral flange portions, and the flange portions and lateral wedge clamps can have various configurations. References is made to the appended claims for a definition of the invention.

What we claim is:

1. In an injection molding apparatus having a plurality of heated nozzles spaced along a common elonaged manifold with a first side surface, each nozzle having a forward end, a read end, and a second side surface, each nozzle being located with the forward end extending into a well in a cavity plate, each nozzle having a melt channel extending from a melt channel inlet on the second side surface to a gate leading to a cavity, the manifold having a longitudinal melt bore, said melt bore extending from a common inlet and branching to a plurality of outlet bores, the outlet bores extending respectively to manifold outlets spaced along the first side surface of the manifold, each outlet being aligned with the melt channel inlet to one of the nozzles, the improvement wherein:

each outlet bore of the manifold extends through a first round flange portion which projects from the first side surface of the manifold, the melt channel of each nozzle has a lateral portion which extends from the melt channel inlet through a second round flange portion which projects from the second side surface of the nozzle, at least one of the first and second round flange portions being tapered and a plurality of clamping means to claimp said first and second round flanges together, inner surfaces to define a round opening therebetween, at least one of the inner surfaces being tapered, each clamping means being mounted to receive in said round opening one of the first round flange portions projecting from the manifold and an abutting second round flange portion of a respective nozzle, the first and second opposed portions of the clamping means being tightened together transversely to where the first and second flange portions abut to secure the first and second flange portions together, whereby each nozzle is securely mounted with a desired angular orientation along the first side surface of the manifold.

2. Injection molding apparatus as claimed in claim 1 wherein each of the first tapered flange portions extends from a connector collar which is secured to the first side surface of the manifold in alignment with one of the outlet bores, the said one of the outlet bores extending through the connector collar to the manifold outlet.

3. Injection molding apparatus as claimed in claim 2 wherein each connector collar has an inwardly projecting neck portion which is received in a recessed seat in the side surface of the manifold to locate the connector collar in alignment with an outlet bore extending from the longitudinal bore in the manifold.

4. Injection molding apparatus as claimed in claim 3 wherein each connector collar is securely bolted to the manifold.

5. Injection molding apparatus as claimed in claim 4 wherein the first and second opposed portions are tightened together by bolts which extend transversely to where the first and second flange portions abut.

6. In an injection molding apparatus having a plurality of heated nozzles extending from a common elongated manifold with a first side surface, each nozzle having a forward end, a rear end, and a second side surface, each nozzle being located with the forward end extending into a well in a cavity plate, each nozzle having a melt channel extending from a melt channel inlet on the second side surface to a gate leading to a cavity, the manifold having a longitudinal melt bore extending from a common inlet, said melt bore branching to a plurality of outlet bores, each outlet bore having a central axis and extending to a separate manifold outlet, the manifold outlets being spaced along the first side surface of the manifold, the improvement wherein:

a melt conduit member is mounted between the manifold and each nozzle, the melt conduit member having an inlet face and an outlet face, the outlet face extending substantially perpendicular to the inlet face, the melt conduit member having a melt conduit extending therethrough, a melt conduit having an inlet portion and an outlet portion, the inlet portion extending from a melt conduit inlet through the inlet face and the outlet portion having a central axis and extending to an outlet through the outlet face, each melt conduit member is clamped along the first side surface of the manifold with the inlet to each melt conduit member in alignment with the outlet from one of the outlet bores, each melt conduit member being clamped in a desired angular position around the central axis of the outlet bore, and each of said nozzles is clamped to a corresponding melt conduit member with the outlet from the outlet portion of the melt conduit in alignment with the melt channel inlet to the nozzle, each nozzle being clamped in a desired angular position around the central axis of the outlet portion of the melt conduit through the corresponding melt conduit member, whereby a desired angular position of each melt conduit member relative to the manifold and a desired angular position of each nozzle relative to the melt conduit member are selected to provide each nozzle with any desired angular orientation.

7. In an injection molding apparatus as claimed in claim 6 wherein:

each outlet bore of the manifold extends through a first round flange portion which projects from the first side surface of the manifold, the inlet portion of the melt conduit extending through each melt conduit member extends through a second round flange portion which projects from the inlet face of the melt conduit member at least one of the first and second round flange portions being tapered, and first clamping means having first and second opposed portions, the first and second opposed portions each having inner surfaces to define a first round opening therebetween, at least one of the inner surfaces being tapered, the first clamping means being mounted to receive in said first round opening one of the first round flange portions projecting from the manifold and an abutting second round flange portion on of a respective melt conduit member, the first and second opposed portions of the first clamping means being tightened together transversely to where the first and second flange portions abut to securely mount the melt conduit member along th side surface of the manifold in said dsired angular position around the central axis of the outlet bore.

8. In an injection molding apparatus as claimed in claim 7 wherein:

the outlet portion of the melt conduit extending through each melt conduit member extends through a third round flange portion which projects from the outlet face of the melt conduit member, the melt channel of each nozzle has a lateral portion which extends from the melt channel inlet through a fourth round flange portion which projecting from the side surface of the nozzle, at least one of the third and fourth round flange portions being tapered and second clamping means having third and fourth opposed portions, the third and fourth opposed portions each having inner surfaces to define a second round opening therbetween, at least one of the inner surfaces being tapered, the second clamping means being mounted to receive in said second round opening the third round flange portion projecting from the outlet face of each melt conduit member and an abutting fourth round flange portion of a respective nozzle, the third and fourth opposed portions of the clamping means being tightened together transversely to where the first and second flange portions abut to securely mount the nozzle to said melt conduit member in said desired angular position around the central axis of the outlet portion of the melt conduit.

9. An injection molding apparatus as claimed in claim 7 wherein said first and second opposed portions of the first clamping means are tightened together by bolts which extend transversely to where the first and second flange portions abut.

10. An injection molding apparatus as claimed in claim 8 wherein said third and fourth opposed portions of the second clamping means are tightened together by bolts which extend transversely to where the third and fourth flange portions abut.

* * * * *